United States Patent Office

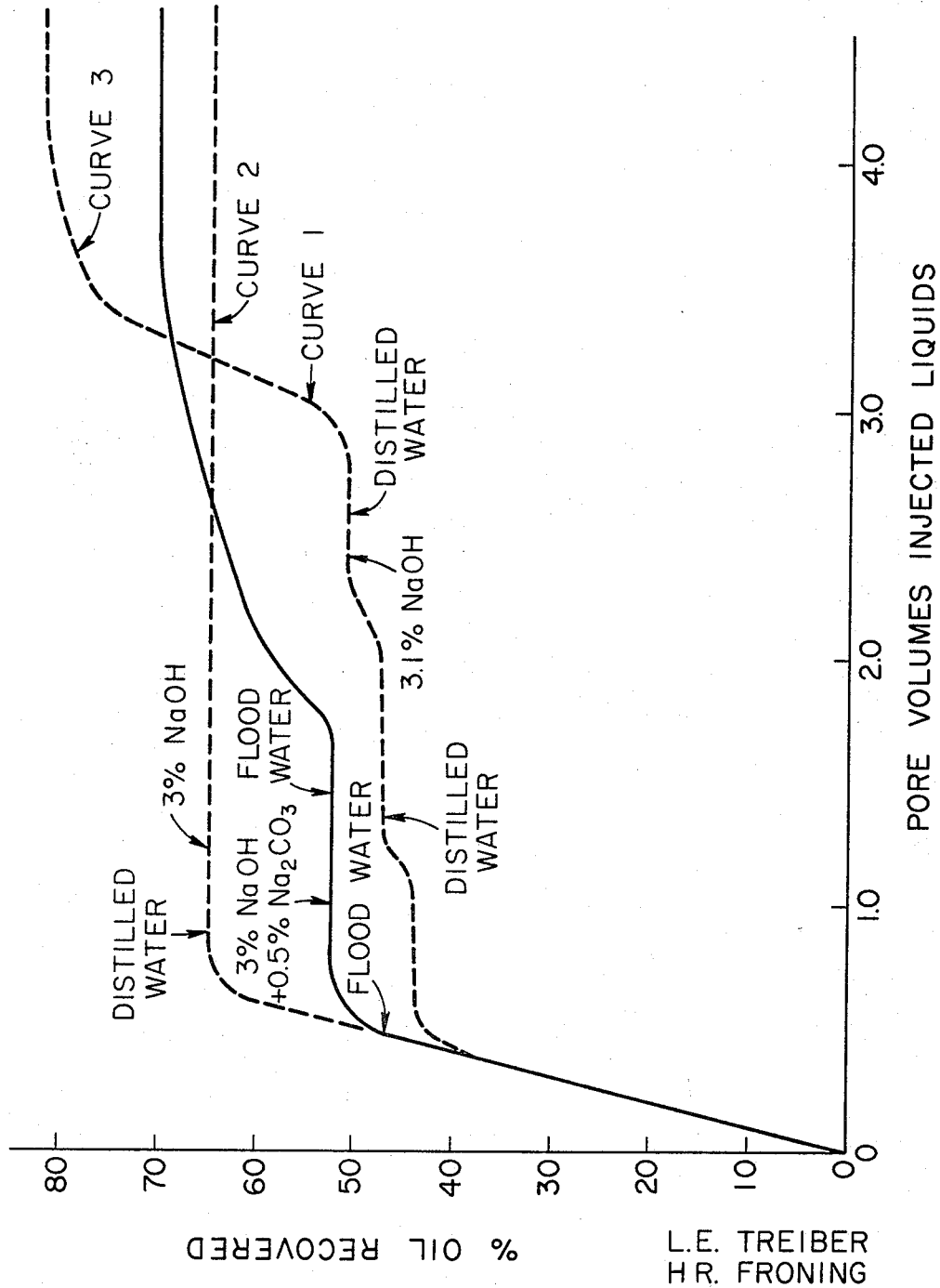

3,414,053
Patented Dec. 3, 1968

3,414,053
REMOVAL OF INTERFERING IONS IN WATERFLOOD
Lawrence E. Treiber, H R. Froning, and Frank O. Jones, Jr., Tulsa, Okla., assignors to Pan American Petroleum Corporation, Tulsa, Okla., a corporation of Delaware
Filed Nov. 18, 1966, Ser. No. 595,409
6 Claims. (Cl. 166—9)

ABSTRACT OF THE DISCLOSURE

A waterflooding process for recovering crude oil uses an organic agent to improve oil recovery. When the effectiveness of the agent is decreased by the presence of multivalent metal ions, such as calcium and magnesium, a water soluble carbonate, such as sodium carbonate, and an alkali metal hydroxide, such as sodium hydroxide, are used to inactivate the multivalent metal ions.

---

In waterflooding processes for the recovery of oil from underground formations, many chemicals have been added to the water to improve oil recovery. One of these chemicals is sodium hydroxide. Recently, it has been discovered that some crude oils contain naturally occurring organic agents which will, in the presence of aqueous sodium hydroxide solutions, reduce the interfacial tension between the oil and the aqueous solution to nearly zero. When formations containing such crude oils are flooded with sodium hydroxide solutions, a much greater percentage of the oil is recovered than is recoverable by use of substantially neutral water. One such process is described in Osoba U.S. Patent 3,175,610. Another process, in which an agent such as a naphthenic acid is introduced in an oil bank ahead of the sodium hydroxide, is described in Reisberg U.S. Patent 3,111,984.

We have found, as noted also by Osoba, that the presence of divalent ions can be very harmful to this type of process. In order for a decrease in interfacial tension to be most effective, the interfacial tension should be decreased as much as possible. In most cases, the interfacial tension should be below about 0.1 dyne per centimeter, and preferably below about 0.01 dyne per centimeter. The interfering nature of divalent metallic ions, such as calcium ions, for example, is so great in the caustic-flooding, interfacial-tension-reduction process that the presence of only about 200 parts per million of this ion may prevent reaching the desired range of interfacial tension. Divalent ion concentrations considerably below this value, for example, about 10 to 30 parts per million, or even lower, are usually desirable. The ion exchange process of Osoba is helpful in reaching low calcium ion concentrations, but still lower concentrations are desirable in view of the extremely low interfacial tensions which are usually required for best results.

An object of this invention is to provide an improved method for waterflooding an oil-bearing formation. A more specific object is to provide a method for reducing the concentration of multivalent ions in a waterflooding operation in which an organic chemical sensitive to the divalent ions is used. A still more specific object is to provide a method for obtaining a very low calcium ion concentration in a waterflooding process in which sodium hydroxide is injected into an oil-bearing formation to form in situ an agent for reducing the interfacial tension between oil and water.

We have found that the multivalent cations can be made inactive by injecting into the formation an aqueous solution containing a water-soluble carbonate and an alkali metal hydroxide. The carbonate precipitates some of the ions, such as calcium, while the hydroxide precipitates other ions, such as magnesium. At least part of the carbonate should be injected ahead of the hydroxide. A batch of water, having a low concentration of multivalent cations, may precede the carbonate and hydroxide. Another such batch of water may follow the carbonate and hydroxide.

The drawing is a group of curves showing oil recovery from sands by various processes, one of the processes being the one which we propose.

The volume of the sodium hydroxide solution and the concentration of sodium hydroxide in the solution may be in the range previously described for sodium hydroxide floods. For example, the volume of sodium hydroxide may be from about 1 or 2 percent to about 15 or 20 percent of the pore volume expected to be flooded. The concentration of sodium hydroxide may be as little as about 0.1 percent, or as much as about 5 or even 10 percent by weight of the solution. The minimum limit is set principally to avoid too rapid loss of the sodium hydroxide through dilution, adsorption, neutralization, or the like. It is also necessary to maintain a pH above about 11.5 if benefits beyond those provided by the sodium carbonate alone are to be produced. The maximum limit is observed in part because of cost considerations and, in part, because the minimum interfacial tension is usually obtained at a pH below about 14.

In preparing the sodium hydroxide solution, the nature of the water used as a solvent may be important. For example, the formation may contain clays which tend to plug the formation in the presence of fresh water. In this case, the sodium hydroxide solution should also contain at least about 5,000 parts per million by weight of sodium chloride. The brine used to prepare the sodium hydroxide solution should not contain much more than about 30,000 parts per million of sodium chloride, however. This is to avoid the higher interfacial tensions which are produced between many oils and brines containing higher salt concentrations. Thus, higher salt concentrations frequently tend to defeat the main purpose of the process which is to provide as low an interfacial tension as possible. If the brine is prepared by adding salt to fresh water, then higher concentrations of salt should also be avoided because of the higher cost.

Some care should be used in selecting an oil field brine for use as a solvent for sodium hydroxide. Most oil field brines contain considerable amounts of calcium and magnesium salts, as well as sodium salts. The water used as a sodium hydroxide solvent should, if possible, be substantially free from divalent ion. Strange as it may seem, however, a few hundred parts per million of calcium and magnesium salts, for example, in the sodium hydroxide solution may not be particularly harmful in our process. The reason is that the sodium carbonate solution which precedes the sodium hydroxide solution saturates the formation with carbonate ions. These carbonate ions react immediately with the calcium and other divalent metal ions in the sodium hydroxide solution which follows the sodium carbonate solution. The result is that the calcium and other divalent ions in the sodium hydroxide solution do not move far into the formation before they are precipitated. Therefore, almost all the oil is contacted by a sodium hydroxide solution substantially free from multivalent ions.

It should be explained at this point that while magnesium carbonate is rather soluble, the hydroxide is not. Therefore, the sodium hydroxide itself eliminates the magnesium ions. Some of the other divalent metal ions commonly found in oil field brines also form very insoluble hydroxides. These include ferrous and manganous ions. The same is true for multivalent ions having a valence above 2 which are known to be present sometimes in damaging concentrations, in oil field brines. The principal such ion is the ferric ion. The other important ions present in damaging concentrations in oil field brines are barium and strontium ions. These both form very insoluble carbonates. It will be apparent, therefore, that the combination of sodium hydroxide and sodium carbonate inactivates all multivalent metallic ions commonly present in oil field brines. Calcium ions are the most prevalent and troublesome, so reference will usually be made hereinafter to calcium ions rather than to the more general terms multivalent or divalent ions. It may be advisable to explain that the term multivalent metallic ion is intended to mean an ion with a valence greater than one. It does not necessarily mean an ion which may have more than one valence, such as iron. Thus, for our purposes, calcium is a multivalent ion, although it has a single valence.

Sometimes it is advisable to add at least a part of the sodium carbonate to the sodium hydroxide solution. In this case, of course, the calcium ions are removed from the solution before the solution enters the formation. Even in such cases, however, the solvent water should not contain more than a few hundred parts per million of multivalent ions. The reason is to avoid the formation of large volumes of precipitated carbonates and hydroxides which may have to be removed by filtration to prevent plugging the pores of the formation at the injection well. Chelating or complexing agents may be used to prevent precipitate formation in the injection water. The choice between use of these agents and filtration will depend upon economics.

It is possible to add all the carbonate to the sodium hydroxide solution. This has the advantage of requiring the preparation and injection of a single solution in the field. As noted above, addition of carbonate ions to the caustic solution also has at least a small advantage in removing calcium ions from the solution before it enters the formation. In spite of these advantages, however, it is preferred to inject the hydroxide and carbonate solutions separately. This is because in at least some cases the recovery of additional oil is delayed somewhat when the two chemicals are injected together. A possible explanation is that the hydroxyl ions move more rapidly through the formation than the carbonate ions. The portion of the hydroxyl ions outrunning the carbonate ions could thus become ineffective. In the preferred process, at least a part of the carbonate should be injected ahead of the sodium hydroxide solution. The hydroxide solution, with or without carbonate, but having a pH of at least about 11.5, should then follow.

The carbonate, if injected as a separate solution, should have a volume between about 2 and about 20 percent of the pore volume expected to be flooded. The carbonate solution volume may be about the same as the hydroxide solution volume or may vary widely from this volume. The sodium carbonate concentration should also be in the same range as the sodium hydroxide, that is, about 0.1 to about 5 or 10 percent by weight of the solution. The concentration of the sodium carbonate in solution and the volume of the solution are not particularly critical, however. As noted above, some or all of the sodium carbonate can be added to some or all of the sodium hydroxide solution. About the same limits should be observed on the maximum multivalent ion concentration in the water used as a solvent for the carbonate as for the hydroxide. The reason in the case of the carbonate is simply to avoid excessive formation of precipitates. If filtering equipment is available, solvent water with a higher calcium content can be used, of course. In such case, the concentration of carbonate added to the water should be increased to compensate for the portion lost due to precipitate formation.

Almost any type of water ordinarily used in waterflooding can be employed to force the sodium hydroxide solution through the formation. Since there will be at least some mixing of the sodium hydroxide solution with the water immediately following it, however, it is preferred that at least a small batch of water having no more than a few hundred parts per million of multivalent ions be used immediately following the sodium hydroxide. If such water is readily available, a batch preceding the sodium carbonate is also advisable to sweep most of the multivalent metallic ions out of the formation ahead of the carbonate and thus avoid rapid depletion of the carbonate by precipitation with high concentration of the multivalent ions. The sodium hydroxide solution can, if desired, be followed by a batch of sodium carbonate solution to isolate the sodium hydroxide from high calcium ion concentrations in the flooding water.

Multivalent ions in the formation brines are not particularly troublesome if a batch of water having a low concentration of these ions is injected into the formation ahead of the sodium hydroxide even if no carbonate is used. The bank of water containing little multivalent ions usually displaces the brine sufficiently to avoid serious difficulty. Multivalent ions associated with the formation itself are the ones which cause most of the trouble. It will be obvious, then, that the nature of the formation is important. Unconsolidated silica sand with little clay or limestone causes little trouble which cannot be cured with a fresh water wash ahead of the sodium hydroxide.

If clay is present, the clay can hold sufficient calcium to inactivate interfacial tension reducers, which are either naturally present or are introduced in an oil bank ahead of the sodium hydroxide. Our process is both needed in and ideally suited to silica sandstones with clay as the principal contaminant. The clay holds sufficiently small amounts of calcium and magnesium ions so that the carbonate solution flows through a large volume of the formation before the carbonate becomes spent by reacting with the calcium ions and the sodium hydroxide becomes spent by reacting with magnesium ions.

The sandstone can also contain a limited amount of limestone or even dolomite. The calcium carbonate causes little difficulty but the small amount of magnesium carbonate which is usually present can make the process undesirable from an economic standpoint. As previously noted, magnesium carbonate has some solubility in water. The magnesium ions can inactivate the organic interfacial tension reducing agents. As also noted above, however, in a flood with sodium hydroxide, the magnesium ions do not have an opportunity to react with the organic agents at high pH since the magnesium is rapidly and almost completely precipitated as magnesium hydroxide. The magnesium in limestone is not, therefore, undesirable for technical reasons, but because it depletes the sodium hydroxide so rapidly. Because of the economics, it will generally be undesirable to use our process in a formation containing much magnesium carbonates exposed on the pore surfaces.

Our process can be applied to a formation in various ways. For example, the carbonate and hydroxide can be injected into the formation through an injection well penetrating an oil-bearing formation while oil is recovered from the formation through a producing well penetrating the formation. The process may also be applied in a single well by setting a packer in the well to form two zones in the well and then forcing the carbonate and hydroxide from one of the zones through the formation to the other zone from which oil is produced. Such a process is described in more detail in Henley U.S. Patent 3,163,211. Still other methods of applying the process to the recovery of oil from underground formations may also be used.

Our invention will be better understood from the following examples. A large sample of crude oil from the Patin formation in Louisiana was obtained. When this crude oil was placed in contact with aqueous sodium hydroxide solution, the interfacial tension between the oil and the water was only about 0.01 dyne per centimeter. To determine the relative effectiveness of water and sodium hydroxide solutions in displacing this oil from porous media, tubes were packed with sand, the sand was saturated with the Patin oil and the oil was displaced by the flooding liquids noted in Table III. One sand was Ottawa sand, which is a rather clean, pure, silica sand. The other sand was unconsolidated sand recovered from a Louisiana formation known as the Martin sand. Oil from the Martin sand also usually produces a very low interfacial tension in contact with aqueous sodium hydroxide solution. In each test, the packed tube was first flooded with water until oil recovery substantially stopped. The sand was then flooded with the flooding liquids shown in the table. The formation water was actually synthetically prepared to approximate analyses of brines in the Martin and Patin sands. The composition is shown in Table I.

TABLE I.—SYNTHETIC FORMATION WATER

| | Parts per million |
|---|---|
| NaCl | 120,950 |
| $CaCl_2$ | 11,736 |
| $MgCl_2$ | 1,880 |
| $NaHCO_3$ | 361 |
| $Na_2SO_4$ | 166 |

The flood water was also synthetically prepared to approximate fresh flooding water available near a field to be flooded by our technique. The composition of the fresh water is shown in Table II.

TABLE II.—SYNTHETIC FRESH WATER

| | Parts per million |
|---|---|
| $NaHCO_3$ | 144 |
| $CaCl_2$ | 120 |
| $MgCl_2$ | 98 |
| $Ca(HCO_3)_2$ | 96 |

When distilled water was used in the flooding operation, distilled water was also used to form the solutions of sodium hydroxide, carbonates, and the like. When synthetic fresh water was used in the flooding operation, then fresh water was used to make up the solutions. Results of the flooding tests are shown in Table III.

hydroxide solution removed enough of the high-calcium synthetic formation brine to permit the sodium hydroxide to work.

In Test 2, curve 2 in the drawing, the only difference from Test 1 was that the sand was different. It was possible to obtain a sample of the unconsolidated sand which makes up the Martin formation in one oil producing area, and this sand was used to pack the tube. The results of Test 2 show that the distilled water wash was not sufficient to permit the sodium hydroxide to be effective. Obviously, something associated with the Martin sand kept the sodium hydroxide from working. This test was an extreme case since in other tests up to about 4 percent additional oil was produced from the Martin sand by the sodium hydroxide. Still, it is apparent that the results are not as good as would be expected from Test 1.

In Test 3, curve 3 in the drawing, some sodium carbonate was added to the sodium hydroxide solution. It will be obvious from both the table and the curve that a substantial amount of additional oil was produced. This was in spite of the presence of several hundred parts per million of calcium and magnesium salts in the water preceding and following the solution of hydroxide and carbonate. The same water was used in preparing the solution of chemicals. As noted above, however, the carbonate precipitated the calcium ions, and the hydroxide precipitated the magnesium ions so the solution injected into the sand actually was substantially free of calcium and magnesium ions. The test shows that as much as 300 or 400 parts per million of divalent metal salts can be tolerated in the water immediately preceding and following the carbonate and hydroxide solutions. As shown by Test 1, one water bank substantially completely displaces another one. The distilled water bank displaced the high-calcium brine sufficiently to allow the sodium hydroxide to perform its function. The carbonate solution, or the leading edge of a mixed carbonate and hydroxide solution, can perform this same function with the loss of some chemicals. Thus, the carbonate and hydroxide solution or solutions can be immediately preceded and followed by high-calcium brines or may be injected into the formation without pre-treatment. It is greatly preferred, how-

TABLE III

| Test | Flooding Liquid | Formation | Oil | Oil Recovery, Percent | |
|---|---|---|---|---|---|
| | | | | Total | Increase |
| 1 | Formation water and distilled water | Ottawa | Patin | 51 | |
| | 3.1% NaOH | | | 82 | 31 |
| 2 | Formation water and distilled water | Martin | Patin | 64.6 | |
| | 3% NaOH | | | 64.6 | 0 |
| 3 | Formation water and distilled water | Martin | Patin | 51.3 | |
| | 3% NaOH and 0.5% $Na_2CO_3$ | | | 70.1 | 17.8 |
| 4 | Formation water and distilled water | Martin | Patin | 41.7 | |
| | 0.5% $Na_2CO_3$ and distilled water | | | 41.7 | 0 |
| | 3.1% NaOH | | | 64.8 | 23.1 |
| 5 | Formation water and flood water | Martin | Patin | 44.0 | |
| | 7.7% $(NH_4)_2CO_3$ and flood water | | | 44.0 | 0 |
| | 3% NaOH | | | 72.6 | 28.6 |
| 6 | Formation water and flood water | Martin | Patin | 53.2 | |
| | 4% NaOH and 5.3% $Na_2CO_3$ | | | 78.5 | 25.3 |
| 7 | Formation water and flood water | Martin | Patin | 58.5 | |
| | 2.5% $Na_2CO_3$ | | | 73.0 | 14.5 |
| 8 | Formation water and flood water | Martin | Martin | 61.7 | |
| | 5% $Na_2CO_3$ and 8% NaOH | | | 83.2 | 21.5 |
| 9 | Formation water and distilled water | Martin | Martin | 56.4 | |
| | 3.1% NaOH | | | 60.5 | 4.1 |
| 10 | Formation water and distilled water | Martin | Patin | 63.4 | |
| | 5% sodium silicate ($SiO_2/Na_2O$ Ratio 3.22) | | | (¹) | |
| | 3% NaOH | | | 76.3 | 12.9 |

¹ Sodium hydroxide solution immediately followed sodium silicate so effects of sodium alone are not known.

Results of the first three tests are also shown in the drawing, to which reference should now be made. In the first test, curve 1 in the drawing, the tube was packed with Ottawa sand, a clean silica sand. When this sand was flooded with synthetic formation water and then with distilled water, 51 percent of the oil was removed from the sand. When a bank of sodium hydroxide solution was forced through the sand by distilled water, another 31 percent of the oil was produced. It is obvious that the wash of distilled water preceding the sodium ever, to precede and follow the carbonate and hydroxide with water banks low in multivalent ions. Not only do such banks avoid direct contact between the chemicals and formation brines, but they also reduce to at least some degree the multivalent ions left on the surfaces of the formation pores. As a result, the amounts of carbonate and hydroxide lost in precipitating these ions are reduced, thus extending the distance to which the solutions will penetrate the formation before becoming ineffective.

Results of the remaining tests are reported only in tabular form for purposes of brevity.

Test 4 shows two things: First, that a rather low concentration, 0.5 percent, of sodium carbonate did not produce additional oil by itself and, second, that a carbonate bank preceding the hydroxide, rather than being mixed with it as in Test 3, is effective for eliminating multivalent ions sufficiently to permit the hydroxide to displace more oil.

Test 5 shows that ammonium carbonate also overcomes the effects of multivalent ions on the sand. It was important to determine the effect of the ammonium salt since presence of the ammonium ion sometimes affects the solubilities of calcium and magnesium salts. Since ammonium carbonate is effective for our purposes, it is obvious that the ammonium ion did not interfere with the action of the carbonate ion and that it is the carbonate ion which is important. Therefore, it is equally apparent that other water soluble carbonates, such as potassium carbonate and the other alkali metal carbonates, can be used. For our purposes, a water soluble carbonate is one having a solubility of at least about 0.1 gram per 100 grams of water, and preferably at least about 5 or 10 grams per 100 grams of water.

Test 6 shows that the concentrations of hydroxide and carbonate can be varied considerably and good results will still be obtained.

Test 7 shows the effects of higher concentrations of sodium carbonate. Test 4 demonstrated that lower concentrations of sodium carbonate did not produce more oil. The higher concentrations used in Test 7 did produce more oil. When the high concentration carbonate solution left the sand, the pH was about 10.5. This was enough to produce more oil. When the low concentration solution left the sand, the pH was only about 7.5. Some of the carbonate in Test 4 was, of course, lost in passing through the sand. The rest seemed to have been converted to the bicarbonate by acidic materials in the sand and oil. The bicarbonate was, however, effective in precipitating calcium as soon as the hydroxide reached any particular volume of sand and raised the pH. Therefore, the combination of low concentration sodium carbonate with sodium hydroxide was effective for producing more oil while the low concentration of carbonate alone was not effective for producing more oil. It will be obvious that for our purposes the bicarbonates are effective as well as the carbonates.

Test 8 shows the effects of two variations. First, the oil was from the Martin sand. Second, the concentrations of both carbonate and hydroxide are high. From the results, it is obvious that our process is effective under these conditions. The Martin oil, which was used, is another one which forms a very low interfacial tension in contact with sodium hydroxide.

Test 9 simply shows that, in the absence of a soluble carbonate, sodium hydroxide is not very effective in recovering additional oil from a flooded-out Martin sand containing Martin crude oil.

Test 10 illustrates a very interesting point. Soluble silicates in high concentrations are at least somewhat effective in permitting sodium hydroxide to form interfacial tension reducing agents with the naturally occurring organic compounds in the Patin oil. This was somewhat surprising. In Petroleum Production Engineering (Exploitation), by L. C. Uren, McGraw-Hill Book Company, 2d Ed. (1939), on page 450, the comment is made that sodium hydroxide reacts with silica in formations to form sodium silicate. This has been confirmed in the field. Therefore, in a sodium hydroxide flood, sodium silicate is present. The results of Tests 2 and 9, however, show that the results with sodium hydroxide were not as good as with sodium silicate followed by sodium hydroxide in Test 10.

A little consideration of the circumstances provides an explanation. Reaction of the sodium hydroxide with silica takes time. As the sodium hydroxide flows through the formation, the trailing edge has at least a low concentration of silicate. The leading edge has none. Since there is no silicate ion in the leading edge to inactivate the calcium ions, the calcium ions remain available to inactivate the interfacial tension reducing agent. The pretreatment by a high concentration of sodium silicate inactivated the calcium ions before the sodium hydroxide arrived to form the interfacial tension reducing agent.

The solubility of calcium silicate is about 0.01 gram in 100 grams of water at about 20° C. Therefore, the calcium silicate concentration remaining in the solution may have been about 100 parts per million. This would provide about 20 to 25 parts per million of calcium ion in solution. While this calcium ion concentration was low enough to permit the sodium hydroxide to provide improved oil recovery, the results were not as good as when sodium carbonate was used to reduce the calcium ion concentration to a much lower value.

If calcium ions are the principal divalent ion present, then other anions, such as silicate, phosphate, fluoride, sulfite, oxalate, and the like, can be used. Such anions should form calcium salts having a solubility of less than about 0.01 gram per 100 grams of water. If other divalent ions, such as barium, strontium, and the like, are present in large amounts, then some of the anions, such as fluoride and silicate, should not be used in place of carbonate. Even when calcium is the principal troublesome ion, some of the other anions cannot be successfully used under certain conditions. For example, if the formation contains oxygen from previous waterflooding operations, sulfites will be oxidized and lose their effectiveness. Phosphates will be too rapidly lost in formations containing much calcium carbonate. The water soluble carbonates are unique in their stability, their ability to propagate through the formation, and in their ability to form alkaline earth metal salts having very low solubilities. As explained above, magnesium is an exception, but the sodium hydroxide itself precipitates the magnesium. Many of the other multivalent ions found in formation waters also form insoluble carbonates but most of these, such as iron and manganese, form even more insoluble hydroxides, so there is little problem with ions of such metals.

Alternates to sodium hydroxide for increasing the pH of the flooding water include such strongly basic materials as sodium sulfide. The preferred group of agents for this purpose consists of the hydroxides of the alkali metals. Still others will occur to those skilled in the art. Sodium hydroxide is greatly preferred, however, because of its widespread availability, low cost, and great effectiveness.

Our process can be considered broadly as a waterflooding process in which an organic agent sensitive to multivalent metal ions is employed to improve oil recovery. In our precess, sodium carbonate is used to remove the alkaline earth metal ions other than magnesium. The sodium hydroxide preceipitates the magnesium ions together with ions of iron, maganese, and the like, which form more soluble carbonates. In the process described above, the sodium hydroxide also performs another function. This is to form within the formation an interfacial tension agent. Our method is also applicable to other processes in which an organic agent sensitive to divalent metal ions is used but in which the sodium hydroxide does not serve the second function of forming an active agent. For example, in waterflooding operations where an anionic surface active agent, such as dodecyl benzene sulfonate is added to the water to displace the oil from the formation, reduce interfacial tension or the like, the agent may be very sensitive to divalent metal ions. Preceding such a waterflooding operation with a combination of a water soluble carbonate and an alkali metal hydroxide will be effective in causing the divalent metal ions to become inactive. The process is also applicable to polymer floods where the polymer includes some anionic groups. Examples include the acrylate-acrylamide copolymers, partially hydrolyzed polyacrylamides and the copolymers of maleic anhydride with ethylene, vinyl acetate and the like.

In a preferred field application of our process, an oil producing formation at a depth from about 5,500 feet to about 5,600 feet produces oil which has an interfacial tension of about 0.01 dyne per cetimeter in contact with aqueous sodium hydroxide solutions. Wells are on a 5-acre spacing. Into each injection well the following are injected in sequence:

(1) 10,000 barrels (42 U.S. gallons per barrel) of fresh water.
(2) 5,000 barrels of fresh water containing about 6 pounds of sodium carbonate per barrel.
(3) 4,000 barrels of fresh water containing about 5 pounds of sodium hydroxide per barrel.
(4) 15,000 barrels of fresh water.
(5) A mixture of formation brine and fresh water normally used in waterflooding.

In all cases, the fresh water has approximately the composition shown in Table II. Oil is produced from other wells in the field. Increased recovery of oil over that recoverable by an ordinary waterflood amounts to about 5,000 barrels of oil times the number of injection wells.

The preferred embodiments, alternates and variations described above are given by way of example only. We do not wish to be limited to these examples, but only by the following claims.

We claim:
1. In a method for recovering oil from a formation in which method the formation is waterflooded, in which oil is recovered from at least one well penetrating said formation, in which an organic agent is present which improves oil recovery and in which the presence of multivalent cations decreases the effectiveness of said agent, the improvement comprising injecting into said formation a water-soluble carbonate and an alkali metal hydroxide in aqueous solution, at least part of said carbonate and hydroxide solution having a pH of at least about 11.5, and at least part of said carbonate being injected ahead of said hydroxide whereby an increased amount of oil is recovered in the waterflooding process.

2. The method of claim 1 in which said carbonate is sodium carbonate and said hydroxide is sodium hydroxide.

3. In a method for recovering oil from a formation by a waterflooding process in which an aqueous solution of an alkali metal hydroxide is injected into said formation to form in situ an interfacial tension reducing agent with an organic agent in the oil in said formation and thus improve oil recovery, the improvement comprising injecting no later than simultaneously with said hydroxide an aqueous solution of a water-soluble carbonate to inactivate divalent cations which would otherwise interfere with the action of said interfacial tension reducing agent, the concentration of said hydroxide and of said carbonate being from about 0.1 to about 10 percent by weight of the solution in which they are injected and at least part of said carbonate being injected ahead of said hydroxide.

4. The method of claim 3 in which said carbonate is sodium carbonate and said hydroxide is sodium hydroxide.

5. The method of claim 4 in which said hydroxide and carbonate are preceded and followed by water containing no more than about 400 parts per million of salts of multivalent ions.

6. In a method for recovering oil from a formation by a waterflooding process in which an aqueous solution of an alkali metal hydroxide is injected into said formation to form in situ an interfacial tension reducing agent with an organic agent in the oil in said formation and thus improve oil recovery, and in which the presence of calcium ions in the formation interferes with the effectiveness of said interfacial tension reducing agent, the improvement comprising injecting no later than simultaneously with said hydroxide an aqueous solution of a water-soluble salt of an anion selected from the group consisting of carbonate, fluoride, oxalate, silicate, sulfite and phosphate to inactivate said calcium ions and thus prevent interference with said interfacial tension reducing agent, the concentrations of said hydroxide and said carbonate being between about 0.1 and about 10 percent by weight of the solution in which they are injected into said formation and at least part of said water-soluble salt being injected ahead of said hydroxide.

References Cited
UNITED STATES PATENTS

| | | | |
|---|---|---|---|
| 2,787,326 | 4/1957 | Hughes | 166—38 |
| 3,025,911 | 3/1962 | Bergman | 166—38 X |
| 3,087,539 | 4/1963 | Maurer | 166—9 |
| 3,091,291 | 5/1963 | Little et al. | 166—38 X |
| 3,111,984 | 11/1963 | Reisberg | 166—9 |
| 3,160,205 | 12/1964 | Harvey et al. | 166—9 |
| 3,175,610 | 3/1965 | Osoba | 166—9 |
| 3,298,436 | 1/1967 | McCardell | 166—9 |
| 3,330,347 | 7/1967 | Brown et al. | 166—9 |
| 3,344,858 | 10/1967 | Gilchrist et al. | 166—38 X |

CHARLES E. O'CONNELL, *Primary Examiner.*

IAN A. CALVERT, *Assistant Examiner.*